C. C. WALWORTH.
Steam-Heater Radiators.
No. 158,612.             Patented Jan. 12, 1875.
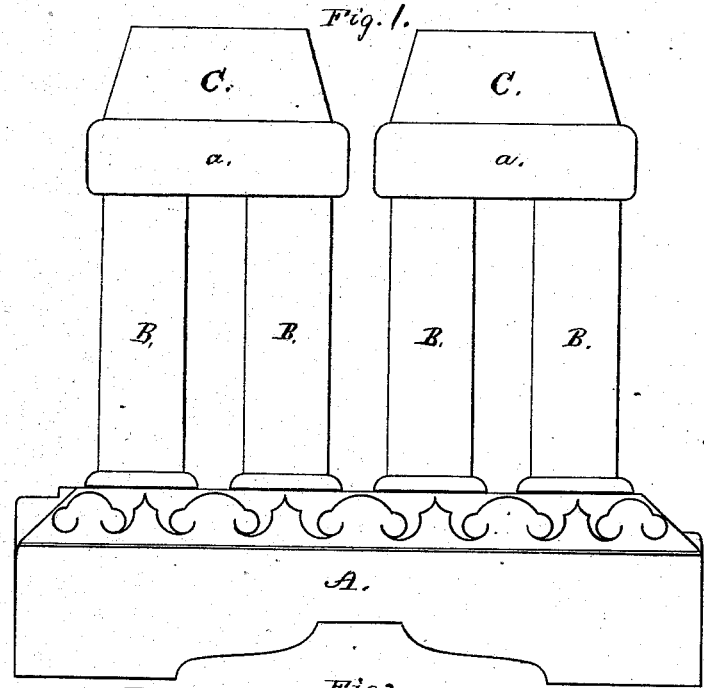
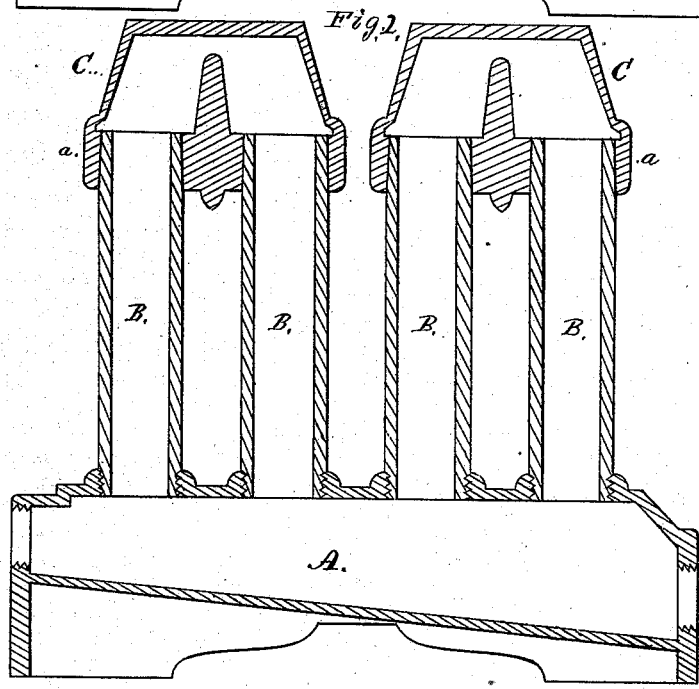
Witnesses.
Geo Gray
S. C. Hale
Caleb C. Walworth
by his attorney
F. P. Hale

UNITED STATES PATENT OFFICE.

CALEB C. WALWORTH, OF BOSTON, MASSACHUSETTS.

IMPROVEMENT IN STEAM-HEATER RADIATORS.

Specification forming part of Letters Patent No. 158,612, dated January 12, 1875; application filed December 21, 1874.

*To all whom it may concern:*

Be it known that I, CALEB C. WALWORTH, of Boston, in the county of Suffolk and State of Massachusetts, have invented a new and useful Improvement in Heat-Radiators; and I do hereby declare that the following is a full, clear, and exact description thereof, which will enable others skilled in the art to which it pertains to make and use the same, reference being had to the accompanying drawings and to the letters of reference marked thereon, which form a part of this specification.

In the said drawings, Figure 1 denotes a side elevation, and Fig. 2 a central, vertical, and longitudinal section, of a heat-radiator constructed in accordance with my invention.

My invention has reference to the method of connecting what is technically termed a "return-bend" to the upper end of each pair of vertical pipes of a heat-radiator; and consists in dispensing with the screws ordinarily formed on the upper ends of the pipes and in the ends of the return-bend, and so forming and constructing the said parts as to produce a steam-tight connection, the same being as hereinafter fully set forth and claimed.

Heretofore, in the construction and connection of the return-bend or connecting-cap with the pipes of a heat-radiator, each pair of pipes has had male screws cut on both their upper and lower ends, one being a right, and the other a left, handed screw; each of the return-bends also having female screws formed on both of its ends, one being a right, and the other a left, handed screw, such construction of the parts being necessary in order to enable the pairs of pipes to be connected with the return-bends and the base of the radiator. This construction is objectionable on account of the labor, time, great skill, and nicety required in fitting the screws so that the threads of each pair shall work in unison, as each pair of such pipes has to be connected both with the return-bend and the base of the radiator at the same time, such also necessitating the employment of two workmen in putting the parts together.

In the drawing, A denotes the base of an ordinary heat-radiator, as employed in heating buildings by steam; B B, &c., a series of vertical heat-radiating pipes; and C C, the return-bends or caps, connecting the upper ends of each pair of pipes B. The pipes B are formed on their lower ends with male screws, to screw into the base A, in the ordinary manner. The neck or upper end of each pipe B I turn or reduce to a smooth cylindrical shape, or with a slight taper, just sufficient to enable it to enter the bore of the bend or cap. Each of the return-bends or caps I form with a passage through it, and, preferably, with a flat top, so as to enable it to be compressed or driven firmly onto the pipes without crushing the caps. Furthermore, the lower end of each of the caps I form with a re-enforcing band, *a*, which is to circumscribe the ends of the pipes B. The ends of each bend I ream out of a diameter to correspond with the entering ends of the pipes B, with which they are to be connected.

The parts being thus formed, the pipes are to be first screwed into the base A. A cap or bend is next to be placed upon the upper ends of each pair of contiguous pipes, and, by means of a sledge or other suitable implement, the said caps are firmly driven upon the ends of the pipes; or they may be compressed thereon by means of any suitable mechanism.

By these means a simple, strong, and perfectly steam-tight connection is secured.

What I claim as my invention is—

The improved heat-radiator, having its return-bends and heat-radiating pipes formed and connected as described and shown, so as to produce a steam-tight connection, as set forth.

In testimony that I claim the foregoing as my own invention, I affix my signature in presence of two witnesses.

CALEB C. WALWORTH.

Witnesses:
F. P. HALE,
F. C. HALE.